(12) United States Patent
Stolfus

(10) Patent No.: US 11,927,104 B2
(45) Date of Patent: Mar. 12, 2024

(54) AIRCRAFT ENGINE SENSING APPARATUS WITH INSULATED CONNECTION WIRES

(71) Applicant: Honeywell International Inc., Charlotte, NC (US)

(72) Inventor: Joel Douglas Stolfus, Freeport, IL (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/808,286

(22) Filed: Jun. 22, 2022

(65) Prior Publication Data

US 2023/0417157 A1    Dec. 28, 2023

(51) Int. Cl.
*G01P 1/02* (2006.01)
*B64D 45/00* (2006.01)
*F01D 21/00* (2006.01)

(52) U.S. Cl.
CPC .......... *F01D 21/003* (2013.01); *B64D 45/00* (2013.01); *G01P 1/026* (2013.01)

(58) Field of Classification Search
CPC ........ F01D 21/003; B64D 45/00; G01P 1/026
USPC ........................................................ 415/118
See application file for complete search history.

(56) References Cited

U.S. PATENT DOCUMENTS

| | | | | |
|---|---|---|---|---|
| 4,196,390 A | * | 4/1980 | Pitkin .................... | F01D 17/06 324/262 |
| 4,511,840 A | * | 4/1985 | Leach, Jr. .............. | G01P 1/026 324/160 |
| 5,520,461 A | * | 5/1996 | Curry ..................... | G01K 1/10 374/208 |
| 10,174,629 B1 | * | 1/2019 | Valva ..................... | F16C 33/667 |
| 11,054,314 B2 | * | 7/2021 | Christensen ........... | G01K 13/02 |
| 2004/0261535 A1 | | 12/2004 | Kurtz et al. | |
| 2007/0213917 A1 | * | 9/2007 | Bruno ..................... | F01D 25/20 701/100 |

(Continued)

FOREIGN PATENT DOCUMENTS

| CN | 101819214 B | 9/2011 |
|---|---|---|
| CN | 114413940 A | 4/2022 |

OTHER PUBLICATIONS

"High Output Industrial VRS Magnetic Speed Sensors," Honeywell Sensing and Control, 1-8, (Mar. 2007).

(Continued)

*Primary Examiner* — J. Todd Newton
(74) *Attorney, Agent, or Firm* — Alston & Bird LLP

(57) ABSTRACT

Various examples of the present disclosure provide aircraft engine sensing apparatuses and methods of manufacturing aircraft engine sensing apparatuses. For example, an example aircraft engine sensing apparatus includes an aircraft engine sensor, a plurality of connection wires, and at least one ceramic insulator. In some examples, the aircraft engine sensor is positioned within an aircraft engine. In some examples, the plurality of connection wires connect the aircraft engine sensor to a sensor connector. In some examples, the plurality of connection wires are positioned within a wire protection housing. In some examples, the at least one ceramic insulator is positioned within the wire protection housing and defines a plurality of insulator openings. In some examples, each of the plurality of connection wires passes through one of the plurality of insulator openings.

16 Claims, 8 Drawing Sheets

(56) References Cited

U.S. PATENT DOCUMENTS

| | | | | |
|---|---|---|---|---|
| 2009/0309577 | A1* | 12/2009 | Turner | G01P 3/488 |
| | | | | 324/174 |
| 2011/0308331 | A1* | 12/2011 | Bodin | G01P 3/488 |
| | | | | 73/862.193 |
| 2016/0363001 | A1* | 12/2016 | Argote | F02C 9/48 |
| 2020/0339244 | A1* | 10/2020 | Tomescu | B64C 11/303 |
| 2021/0356491 | A1 | 11/2021 | Wang et al. | |
| 2022/0390328 | A1* | 12/2022 | Garnier | G01M 15/14 |

OTHER PUBLICATIONS

Extended European Search Report dated Oct. 20, 2023 for EP Application No. 23176449, 8 page(s).

* cited by examiner

AIRCRAFT ENGINE SENSING APPARATUS WITH INSULATED CONNECTION WIRES

FIELD OF THE INVENTION

Example embodiments of the present disclosure relate generally to sensing and/or detecting operations parameters associated with aircraft engines.

For example, example aircraft engine sensing apparatuses in accordance with some embodiments of the present disclosure are implemented to detect rotational speeds of aircraft engines. Such example aircraft engine sensing apparatuses comprise insulated connection wires that satisfy operation safety requirements (such as, but not limited to, dielectric test requirements).

Various embodiments of the present disclosure also provide example methods of manufacturing such aircraft engine sensing apparatuses.

BACKGROUND

Applicant has identified many technical challenges and difficulties associated with sensors. For example, many speed sensors are not suitable for implementation in high temperature and ultra-high temperature environments, such as, but not limited to, the environment within an aircraft engine.

BRIEF SUMMARY

Various embodiments described herein are related to example aircraft engine sensing apparatuses and example methods for manufacturing aircraft engine sensing apparatuses.

In some embodiments, an aircraft engine sensing apparatus is provided. In some embodiments, the example aircraft engine sensing apparatus comprises an aircraft engine sensor, a plurality of connection wires, and at least one ceramic insulator. In some embodiments, the aircraft engine sensor is positioned within an aircraft engine. In some embodiments, the plurality of connection wires connect the aircraft engine sensor to a sensor connector. In some embodiments, the plurality of connection wires are positioned within a wire protection housing. In some embodiments, the at least one ceramic insulator is positioned within the wire protection housing and defines a plurality of insulator openings. In some embodiments, each of the plurality of connection wires passes through one of the plurality of insulator openings.

In some embodiments, the aircraft engine sensor comprises a rotational speed sensor.

In some embodiments, the aircraft engine comprises an engine shaft and a toothed wheel secured to the engine shaft. In some embodiments, the engine shaft passes through a central opening of the toothed wheel. In some embodiments, the rotational speed sensor is positioned adjacent to the toothed wheel.

In some embodiments, the aircraft engine comprises an engine shaft and a driven gear secured to the engine shaft. In some embodiments, the engine shaft passes through a central opening of the driven gear. In some embodiments, the rotational speed sensor is positioned adjacent to the driven gear.

In some embodiments, the aircraft engine sensor is positioned within a sensor protection housing.

In some embodiments, the sensor protection housing is secured to an inner engine casing of the aircraft engine.

In some embodiments, the sensor protection housing is welded to the wire protection housing.

In some embodiments, at least a portion of the wire protection housing is positioned within the aircraft engine.

In some embodiments, the plurality of connection wires and the wire protection housing comprise metal material.

In some embodiments, the sensor connector is positioned within a connector protection housing.

In some embodiments, the connector protection housing is positioned on an engine casing of the aircraft engine.

In some embodiments, the connector protection housing is welded to the wire protection housing.

In some embodiments, the sensor connector comprises a plurality of sensor output pins. In some embodiments, each of the plurality of connection wires is connected to one of the plurality of sensor output pins.

In some embodiments, the at least one ceramic insulator comprises at least one of alumina ceramic material or glass-ceramic material.

In some embodiments, an outer surface of the at least one ceramic insulator is in contact with an inner surface of the wire protection housing.

In some embodiments, none of the plurality of connection wires is in contact with an inner surface of the wire protection housing.

In some embodiments, the aircraft engine sensing apparatus further comprises a plurality of glass insulators.

In some embodiments, at least some of the plurality of glass insulators are positioned between an inner surface of the wire protection housing and an outer surface of the at least one ceramic insulator.

In some embodiments, at least some of the plurality of glass insulators are positioned between the at least one ceramic insulator and at least one of the plurality of connection wires.

In some embodiments, the aircraft engine sensing apparatus further comprises a plurality of ceramic insulators.

In some embodiments, at least some of the plurality of glass insulators are positioned between the plurality of ceramic insulators.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
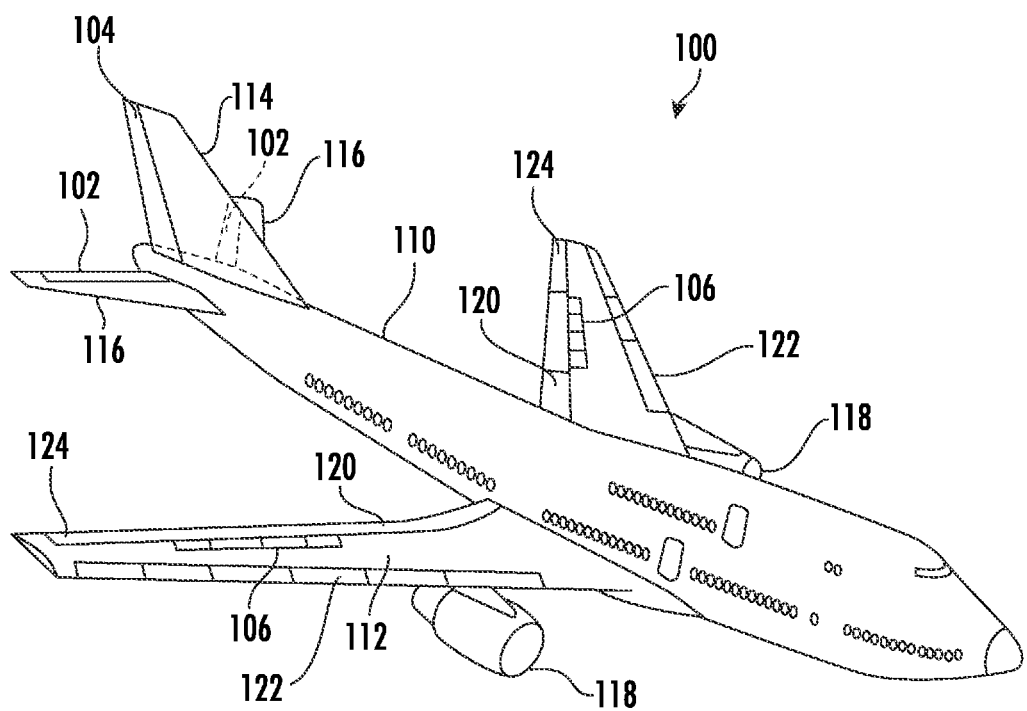
FIG. 1 illustrates an example perspective view of an example aircraft in accordance with some example embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The term "electronically coupled," "electronically coupling," "electronically couple," "in communication with," "in electronic communication with," or "connected" in the present disclosure refers to two or more elements or components being connected through wired means and/or wireless means, such that signals, voltage/current, data and/or information may be transmitted to and/or received from these elements or components.

As described above, there are many technical challenges and difficulties associated with sensors.

For example, sensors (such as, but not limited to, speed sensors) are implemented in aircrafts. In some examples, speed sensors (such as, but not limited to, rotational speed sensors) can be implemented to determine speeds of aircrafts. As an example, a rotational speed sensor can be implemented in aircraft engines (such as, but not limited to, jet engines), and can generate detection signals that indicate the speed, direction and/or position of the engine shaft of the aircraft engines. Based on the detection signals from the rotational speed sensor, the operation speed of the aircraft engines can be determined, which in turn can be used to determine speeds of aircrafts.

In many implementations, sensors are positioned in high temperature and ultra-high temperature environments. Continuing from the aircraft example above, rotational speed sensors need to detect rotating targets (such as, but not limited to, engine shafts) that are deep inside the aircraft engines and in high temperature environments. In some embodiments, detection signals from the sensors need to be conveyed to a connection system (such as, but not limited to, a sensor connector). While the rotational speed sensor is positioned within the aircraft engine (e.g., in a high temperature environment), the connection system (such as, but not limited to, a sensor connector) must be positioned outside the aircraft engine or near the outside of the aircraft engine (e.g. in an environment with a lower temperature than that within the aircraft engine).

Continuing from the aircraft example above, the rotational speed sensors are connected to connection wires that convey detection signals. In such examples, one end of the connection wires is connected to the rotational speed sensor, and the other end of the connection wires is connected to a connection system (such as, but not limited to, a sensor connector). In some embodiments, the connection wires are positioned in an environment within the aircraft engine where extremely high temperature gasses pass through. In some examples, the connection wires are positioned in an environment that is in excess of 400 to 500 degrees Celsius.

In some examples, components of sensors need to be adequately insulated electrically to ensure operation safety. For example, the connection wires are coated with insulation materials to prevent currents from the connection wires coming into contact with other conductors.

In some examples, the insulation materials of the connection wires need to satisfy operation safety requirements such as, but not limited to, dielectric test requirements. The dielectric test verifies the adequacy of electrical insulation of the connection wires to withstand transient/surge events. For example, a dielectric test may be conducted by applying a high voltage on the housing of the sensor, and detect whether the insulation materials of the connect wires sufficiently insulate the connection wires from the high voltage.

Continuing from the aircraft example above, the connection wires are positioned within and inside a wire protection housing that protects the connection wires from being damaged by debris or blown away by the extremely high temperature gasses. In some examples, the wire protection housing comprises or consists of metal materials that can withstand high temperatures, such as, but not limited to, stainless steel, nickel-based superalloys (such as, but not limited to, Inconel®), and/or the like. In some examples, the connection wires also comprise metal materials. As described above, the connection wires receive detection signals from the rotational speed sensor including but not limited to, current signals. Because both the connection wires and the wire protection housing comprise metal materials that are conductive, the dielectric voltage between the connection wires and the wire protection housing can be between 500 VDC to 1000 VDC.

It can be technically challenging and difficult to satisfy the insulation requirements of the connection wires, especially in environments with high temperatures.

For example, polytetrafluoroethylene material may be coated on the connection wires to insulate the connection wires. However, temperatures in many environments are too high for polytetrafluoroethylene to withstand. When connection wires coated with polytetrafluoroethylene material are placed in such environments (e.g. within aircraft engines), the polytetrafluoroethylene material may melt down or detach from the connection wires, resulting a failure of the dielectric test.

As another example, fiberglass material may be coated on connection wires to insulate the connection wires. However, fiberglass material may fray, which can create open spots that expose the connection wires and result in dielectric failures. In addition, handling fiberglass materials by hand (for example, while manufacturing the sensors) can cause health, safety and environmental issues that include, but not limited to, skin irritation and breathing problems. Further, the fiberglass material can disintegrate from connection wires during use (especially during vibrations), which can in turn lead to dielectric failures. For example, the fiberglass material may be coated on the connection wires through a binding material, and the binding material may burn as a result of high temperature, which can in turn leaves conductive residues in the wire protection housing that can cause a failure of the dielectric test.

Various embodiments of the present disclosure overcome these technical challenges and difficulties, and provide various technical improvements and benefits.

For example, an example aircraft engine sensing apparatus in accordance with some embodiments of the present disclosure may comprise a ceramic insulator. In some embodiments, the ceramic insulator is in the form of ceramic insulating blocks that have individual openings, and these individual openings allow the connection wires to pass through. In some embodiments, the length of the ceramic insulator is the same as or approximate the length of the connection wires, so that the ceramic insulator can sufficiently insulate the connection wires.

Additionally, or alternatively, an example aircraft engine sensing apparatus in accordance with some embodiments of the present disclosure may comprise more than one ceramic insulator (for example, in the form of a plurally of ceramic insulating blocks). In some embodiments, each of the ceramic insulators may be manufactured according to a standard size. In some embodiments, multiple ceramic insulators can be stacked together to insulate the required length of connection wires.

Implementing ceramic insulators in accordance with some embodiments of the present disclosure can overcome these technical challenges and difficulties described above. For example, the ceramic insulators may comprise ceramic material such as, but not limited to, alumina ceramic material and/or glass-ceramic material. The ceramic material is electrically insulating and has a high melting point, allowing the ceramic insulators to withstand high temperature and ultra-high temperature environments such as, but not limited to, within the aircraft engine. Additionally, the ceramic material is long-lasting and hard-wearing, therefore the ceramic insulators can withstand vibration during operation. Further, handling ceramic material during manufacturing is less likely to cause health, safety and environmental issues.

As such, an aircraft engine sensing apparatus that comprises at least one ceramic insulator in accordance with some embodiments of the present disclosure can satisfy operation requirements (including, but not limited to, dielectric test requirements, health, safety and environment requirements, durability requirements, and/or the like) in high temperature and ultra-high temperature environments such as, but not limited to, within the aircraft engine.

Referring now to FIG. 1, an example perspective view of an example aircraft 100 in accordance with some example embodiments described herein is illustrated.

In the example shown in FIG. 1, the example aircraft 100 is in the form of an example airplane. While the description herein provides an example airplane as an example of aircraft, it is noted that the scope of the present disclosure is not limited to this example. In some examples, an example aircraft may be in other forms.

In some embodiments, the example aircraft 100 comprises an aircraft engine 118 that provides the thrusting force needed to propel the example aircraft 100 forward. For example, the aircraft engine 118 may be in the form of a gas turbine engine. Example views associated with example aircraft engines are illustrated and described in connection with at least FIG. 2 and FIG. 3. While the description herein provides a gas turbine engine as an example of an aircraft engine, it is noted that the scope of the present disclosure is not limited to this example. In some examples, an example aircraft engine may be in other forms.

In some embodiments, the example aircraft 100 comprises a fuselage 110. In some embodiments, the shape of the fuselage 110 is designed to optimize aerodynamics.

In some embodiments, the example aircraft 100 comprises wings 112. In some embodiments, the wings 112 provide the lift that is needed to fly the airplane.

In some embodiments, the example aircraft 100 comprises vertical stabilizers 114 and horizontal stabilizers 116, which can stabilize the example aircraft 100 for a smooth travel.

In some embodiments, to guide example aircraft 100 during travel, flight control surfaces are placed on wings 112, horizontal stabilizers 116, and vertical stabilizers 114.

In some embodiments, the primary flight control surfaces on the example aircraft 100 include the ailerons 124, the elevators 102 and the rudder 104. In some embodiments, the ailerons 124 are located on the trailing edges of the wings of the example aircraft 100 and control the roll of the example aircraft 100. In some embodiments, the elevators 102 are located on the horizontal stabilizer of example aircraft 100 and control the pitch of the example aircraft 100. In some embodiments, the rudder 104 is located on the vertical stabilizer of the example aircraft 100 and controls the yaw of the example aircraft 100.

In some embodiments, the wings of the example aircraft 100 also comprise spoilers 106, flaps 120, and slats 122, collectively known as secondary flight control surfaces.

In some embodiments, the spoilers 106 are located on the wings and perform a variety of different functions, including assisting in the control of vertical flight path, acting as air brakes to control the forward speed of the airplane, and acting as ground spoilers to reduce wing lift to help maintain contact between the landing gear and the runway when braking.

In some embodiments, the flaps 120 and the slats 122 are located on the wings of an airplane to change the lift and drag forces affecting the example aircraft 100, with flaps 120 at the trailing edge of wing 112 and slats 122 at the leading edge of the wing 112. In some embodiments, when flaps 120 and slats 122 are extended, the shape of the wing changes to provide more lift. In some embodiments, with an increased lift, the example aircraft 100 is able to fly at lower speeds, thus simplifying both the take-off procedure and the landing procedure.

In some embodiments, the primary flight control surfaces described above are operated by a pilot located in the cockpit of the airplane. For example, the rudder 104 is controlled by a pair of rudder pedals operated by the pilot's feet. In some embodiments, the ailerons 124 are controlled by adjusting a control wheel or control stick to the left or right. For example, moving the control stick to the left controls the left aileron to rise and the right aileron to go down, causing the airplane to roll to the left. In some embodiments, the elevator 102 is controlled by adjusting a control wheel or control stick to the front or back.

In some embodiments, in order to operate the primary flight control surfaces and control the example aircraft 100, the pilot needs data and/or information associated with operation of the example aircraft 100, such as, but not limited to, the speed of the example aircraft 100. In some embodiments, data and/or information associated with operation of the example aircraft 100 can be obtained by implementing one or more sensing apparatuses on one or more components of the example aircraft 100. For example, an example aircraft engine sensing apparatus may be implemented in the aircraft engine 118 of the example aircraft 100 to determine the speed of the example aircraft 100.

Figure 2:
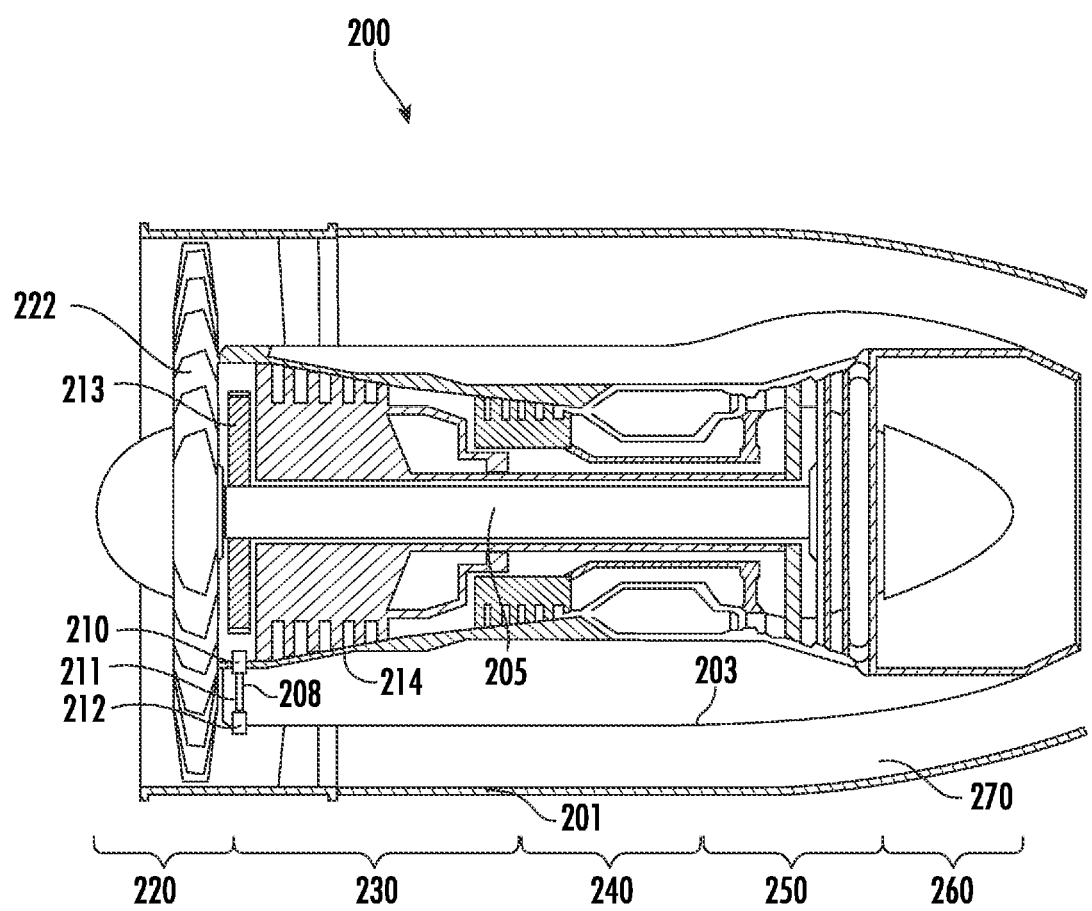
FIG. 2 illustrates an example cross-sectional view of an example aircraft engine in accordance with some embodiments of the present disclosure.

Referring now to FIG. 2, an example cross-sectional view of an example aircraft engine 200 in accordance with some embodiments of the present disclosure is illustrated. Although FIG. 2 depicts a turbofan engine, in general, exemplary embodiments discussed herein may be applicable to any type of engine, including, but not limited to, turboshaft engines.

In some embodiments, the aircraft engine 200 may form a part of, for example, an auxiliary power unit for an aircraft or a propulsion system for an aircraft (such as, but not limited to, the example aircraft 100 described above in connection with FIG. 1).

In some embodiments, the aircraft engine 200 comprises an outer engine casing 201 and an inner engine casing 203. In some embodiments, the aircraft engine 200 comprises a fan section 220, a compressor section 230, a combustion section 240, a turbine section 250, and an exhaust section 260.

In some embodiments, the fan section 220 comprises a fan 222. In some embodiments, as the fan 222 rotates, the fan 222 draws in air and accelerates air. In the example shown in FIG. 2, the outer engine casing 201 and an inner engine casing 203 define a bypass section 270. In some embodiments, a portion of the accelerated air from the fan section 220 is directed through the bypass section 270, which provides a forward thrust that propels the aircraft forward. In some embodiments, the portion of air exhausted from the fan is directed into the compressor section 230.

In some embodiments, the compressor section 230 is positioned adjacent to the fan section 220 and may include a series of compressors that raise the pressure of the air directed into it from the fan section 220. In some embodiments, the compressors may direct the compressed air into the combustion section 240 that is positioned adjacent to the compressor section 230.

In the combustion section 240, the high pressure air is mixed with fuel and combust. In some embodiments, the combusted air is then directed into the turbine section 250 that is positioned adjacent to the combustion section 240. In some embodiments, the turbine section 250 may include a series of rotor and stator assemblies disposed in axial flow series. In some embodiments, the combusted air from the combustion section 240 expands through the rotor and stator assemblies and causes the rotor assemblies to rotate the engine shaft 205 for energy extraction. In some embodiments, the air is then exhausted through a propulsion nozzle disposed in the exhaust section 260 that is adjacent to the turbine section 250, providing additional forward thrust that propels the aircraft forward.

In some embodiments, the engine shaft 205 is connected to the fan 222. In some embodiments, the rotation of the engine shaft 205 causes the rotation of the fan 222, and the rotational speed of the fan 222 is the same as the rotational speed of the engine shaft 205. In some embodiments, to detect the rotational speed of the engine shaft 205/the fan 222, an aircraft engine sensing apparatus 208 in accordance with some embodiments of the present disclosure is implemented.

In the example shown in FIG. 2, the example aircraft engine sensing apparatus 208 comprises a sensor protection housing 210, a wire protection housing 211, and a connector protection housing 212.

In some embodiments, an aircraft engine sensor is positioned within the sensor protection housing 210. In some embodiments, the aircraft engine sensor comprises an example rotational speed sensor.

In some embodiments, the aircraft engine 200 comprises an inner engine casing 214. In some embodiments, the engine shaft 205 and the toothed wheel 213 are positioned within the inner engine casing 214. In some embodiments, the sensor protection housing 210 is positioned on and secured to the inner engine casing 214 (for example, welded to the inner engine casing 214), such that the distance between the sensor protection housing 210 and the engine shaft 205 remain constant during operation.

In some embodiments, the aircraft engine 200 comprises a toothed wheel 213. In some embodiments, the toothed wheel 213 is secured to the engine shaft 205. For example, the engine shaft 205 passes through a central opening of the toothed wheel 213. As described above, the fan 222 is secured to the engine shaft 205. As such, the rotational speed of the toothed wheel 213 is the same as the rotational speed of the fan 222.

In the example shown in FIG. 2, the toothed wheel 213 is positioned between the fan 222 and the compressor section 230 of the aircraft engine 200. It is noted that the scope of the present disclosure is not limited to the example shown in FIG. 2. In some examples, an example toothed wheel may be positioned along other locations on the engine shaft 205.

In some embodiments, the sensor protection housing 210 and the aircraft engine sensor positioned within the sensor protection housing 210 are positioned adjacent to the toothed wheel 213, as shown in FIG. 2. For example, the sensor protection housing 210 and the aircraft engine sensor are positioned adjacent to the periphery edges of the toothed wheel 213 (e.g. adjacent to the plurality of teeth of the toothed wheel 213), additional details of which are illustrated and described in connection with at least FIG. 3 to FIG. 4B.

Figure 3:
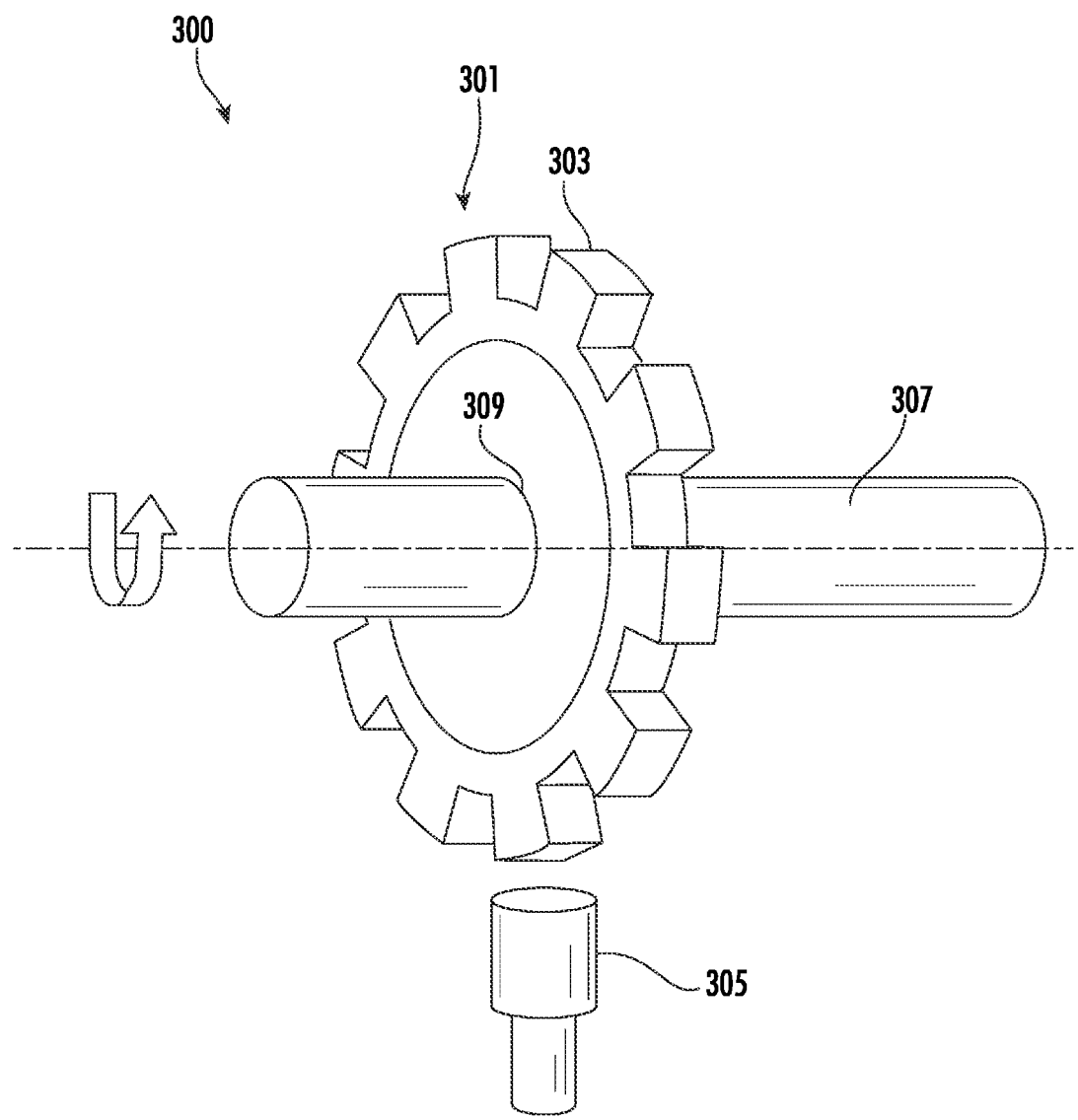
FIG. 3 illustrates an example view of an example toothed wheel of an example aircraft engine and an example aircraft engine sensor in accordance with some embodiments of the present disclosure.

Referring now to FIG. 3, an example view 300 of an example toothed wheel 301 and an example aircraft engine sensor 305 in accordance with some embodiments of the present disclosure is provided.

In some embodiments, the toothed wheel 301 comprises a plurality of teeth 303 that are disposed on the outer periphery of the toothed wheel 301. In some embodiments, the toothed wheel 301 comprises a central opening 309, and the engine shaft 307 of an engine passes through the central opening 309 of the toothed wheel 301. In some embodiments, the toothed wheel 301 is secured on the engine shaft 307, similar to those described above in connection with FIG. 2.

In some embodiments, the aircraft engine sensor 305 comprises a rotational speed sensor. In some embodiments, the aircraft engine sensor 305 is secured to an inner engine casing of the aircraft engine, such that the distance between the aircraft engine sensor 305 and the engine shaft 307 remains constant during operation. As illustrated in FIG. 3, the aircraft engine sensor 305 is positioned adjacent to the toothed wheel 301, similar to those described above in connection with FIG. 2.

Because of the teeth that are disposed on the outer periphery of the toothed wheel 301, the distance between the aircraft engine sensor 305 and the outer periphery surface of the toothed wheel 301 changes as the toothed wheel 301 rotates.

For example, when a tooth of the plurality of teeth 303 of the toothed wheel 301 is rotated to be adjacent to the aircraft engine sensor 305, the distance between the aircraft engine sensor 305 and the outer periphery surface of the toothed wheel 301 decreases. When a gap between two of the plurality of teeth 303 of the toothed wheel 301 is rotated to be adjacent to the aircraft engine sensor 305, the distance between the aircraft engine sensor 305 and the outer periphery surface of the toothed wheel 301 increases.

In some embodiments, the aircraft engine sensor 305 generates detection signals that indicate the rotational speed of the toothed wheel 301 based on changes in distance between the aircraft engine sensor 305 and the outer periphery surface of the toothed wheel 301, details of which are described in connection with at least FIG. 4A and FIG. 4B.

Figure 4A:
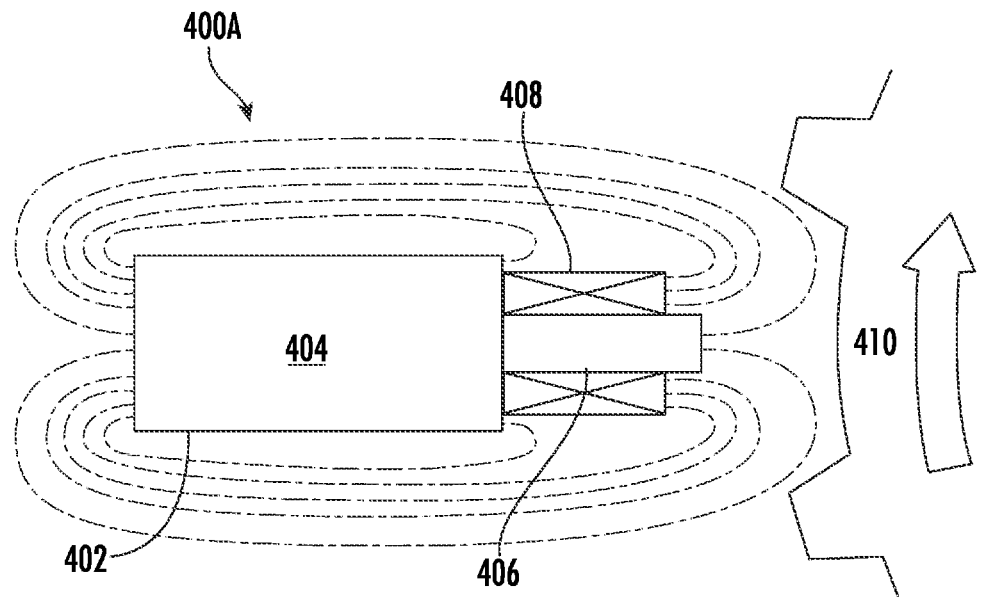
FIG. 4A and FIG. 4B are example diagrams illustrating an example aircraft engine sensor and an example toothed wheel of an example aircraft engine in accordance with some embodiments of the present disclosure.
Figure 4B:
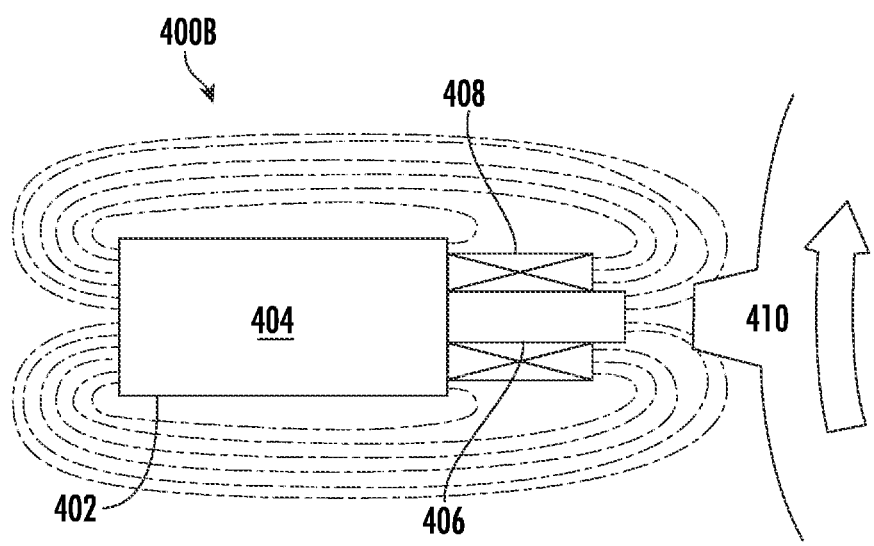

Referring now to FIG. 4A and FIG. 4B, example diagrams 400A and 400B of an example aircraft engine sensor 402 and an example toothed wheel 410 of an example aircraft engine in accordance with some embodiments of the present disclosure are provided.

In the examples shown in FIG. 4A and FIG. 4B, the example aircraft engine sensor 402 is in the form of an example rotational speed sensor. For example, the example aircraft engine sensor 402 comprises a magnet 404, a pole piece 406, and a coil winding 408.

In some embodiments, the magnet 404 establishes a magnetic field as illustrated in FIG. 4A and FIG. 4B. In some embodiments, the example toothed wheel 410 comprises ferrous material (such as, but not limited to, steel, cast iron, and/or the like). For example, the teeth of the example toothed wheel 410 may comprise ferrous material that can be magnetized by the magnet 404.

In some embodiments, as the example toothed wheel 410 rotates, the ferrous material from the example toothed wheel 410 enters and leaves the magnetic field established by the magnet 404, varying the resistance of flow of the magnetic field and changes the strength of the magnetic field.

For example, in the example shown in FIG. 4A, a gap between two of the plurality of teeth of the toothed wheel 410 is rotated to be adjacent to the aircraft engine sensor 402. In such an example, the ferrous material does not interfere with the magnetic field of the magnet 404. As such, the magnetic field is strongest.

As another example, in the example shown in FIG. 4B, a tooth of the plurality of teeth of the toothed wheel 410 is rotated to be adjacent to the aircraft engine sensor 402. In such an example, the ferrous material interferes and weakens the magnetic field of the magnet 404. As such, the magnetic field is weakest.

In some embodiments, the pole piece 406 is secured to the magnet 404. For example, the pole piece 406 is positioned between the example toothed wheel 410 and the magnet 404. In some embodiments, the coil winding 408 is wound on the pole piece 406. As such, change in the strength of the magnetic field induces a current into the coil winding 408. In some embodiments, the value of the current corresponds to the strength of the magnetic field, which in turn corresponds to the positional changes between the teeth of the toothed wheel 410 and the aircraft engine sensor 402. The faster the positional changes, the faster the rotational speed of the example toothed wheel 410. As such, the aircraft engine sensor 402 generates detection signals (for example, current signals that are induced in the coil winding 408), which can indicate the rotational speed of the example toothed wheel 410. In some embodiments, the aircraft engine sensor 402 (for example, the coil winding 408) is connected to example connection wires described herein.

While the description above in connection with FIG. 2 to FIG. 4B provides an example toothed wheel 213 that is secured to the engine shaft 205, it is noted that the scope of the present disclosure is not limited to toothed wheel. In some embodiments, an example driven gear is secured to the engine shaft 205 in addition to the example toothed wheel 213 or in alternative of the example toothed wheel 213. In such embodiments, the driven gear comprises a toothed wheel and a motor that causes a rotation of the toothed wheel, which in turn causes a rotation of the engine shaft 205 and the fan 222. In such embodiments, the sensor protection housing 210 (and the aircraft engine sensor positioned within the sensor protection housing 210) is positioned adjacent to the driven gear, similar to those described above.

Referring back to FIG. 2, as described above, the aircraft engine sensor within the sensor protection housing 210 may comprise an example rotational speed sensor. In such an example, the rotational speed sensor generates detection signals that indicate, for example, the rotational speed and/or the rotational direction of the toothed wheel 213. Because the rotational speed and the rotational direction of the toothed wheel 213 are the same as the rotational speed and the rotational direction of the fan 222, respectively, the rotational speed and the rotational direction of the fan 222 can be determined based on the detection signals.

In some embodiments, to determine the rotational speed and the rotational direction of the fan 222, the detection signals may be conveyed to other electronic components. In particular, a plurality of connection wires are positioned within the wire protection housing 211 and connect the aircraft engine sensor within the sensor protection housing 210 to a sensor connector that is positioned within the connector protection housing 212.

For example, the sensor connector comprises sensor output pins. In some embodiments, each of the connection wires is connected to one of the sensor output pins, which is in turn connected to various electronic components (such as, but not limited to, one or more controllers of the aircraft).

In some embodiments, the connector protection housing 212 is positioned outside or near the outside of the aircraft engine 200. As described above, the aircraft engine 200 comprises an inner engine casing 203. In some embodiments, the inner engine casing 214, the toothed wheel 213, and the engine shaft 205 are positioned within the inner engine casing 203. In the example shown in FIG. 2, the connector protection housing 212 is positioned on and secured to the inner engine casing 203 (for example, welded to the inner engine casing 203).

In some embodiments, the sensor protection housing 210 is secured to the inner engine casing 214 and the connector protection housing 212 is secured to the inner engine casing 203. In some embodiments, the wire protection housing 211 connects and is welded to the sensor protection housing 210 and the connector protection housing 212. As such, the wire protection housing 211 is positioned within the aircraft engine 200.

As described above, the fan 222 rotates to draw in air and accelerates air, which is compressed in the compressor section 230 and combusts with the fuel in the combustion section 240. As such, the connector protection housing 212 (along with the connection wires within the connector protection housing 212) is positioned in an environment where high temperature air passes through, and the temperature in such an environment can exceed 400 to 500 degrees Celsius.

There are many technical challenges and difficulties associated with insulating connection wires in such a high temperature environment, as described above. Various examples of the present disclosure overcome such technical challenges and difficulties, and provide various technical advantages and improvements. For example, various example embodiments of the present disclosure provide example aircraft engine sensing apparatuses that comprise ceramic insulators, details of which are described in connection with at least FIG. 5 to FIG. 8.

Figure 5:
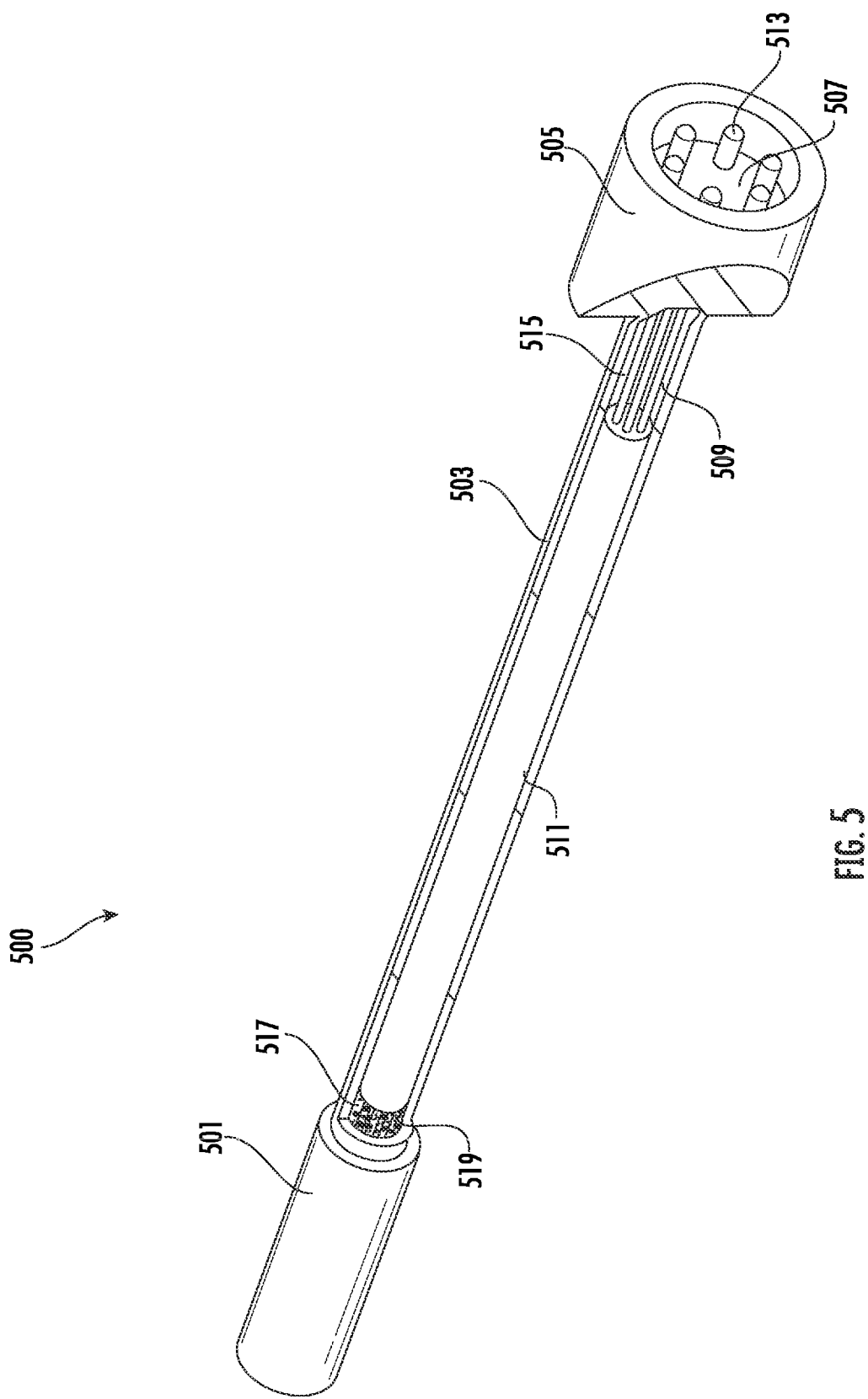
FIG. 5 illustrates an example cutaway view of an example aircraft engine sensing apparatus in accordance with some embodiments of the present disclosure.

Referring now to FIG. 5, an example cutaway view of an example aircraft engine sensing apparatus 500 in accordance with some embodiments of the present disclosure is illustrated.

In some embodiments, the aircraft engine sensing apparatus 500 comprises an aircraft engine sensor, a plurality of connection wires 509, and at least one ceramic insulator 511.

In some embodiments, the aircraft engine sensor is positioned within a sensor protection housing 501. In some embodiments, the aircraft engine sensor comprises a rotational speed sensor, similar to those described above in connection with at least FIG. 2 to FIG. 4B.

Similar to those described above in connection with at least FIG. 2 to FIG. 4B, the sensor protection housing 501 is secured to an inner engine casing of the aircraft engine. As such, the sensor protection housing 501 (and the aircraft engine sensor within the sensor protection housing 501) is positioned within the aircraft engine.

Similar to those described above in connection with at least FIG. 2 to FIG. 4B, the aircraft engine may comprise an engine shaft and a toothed wheel secured to the engine shaft, where the engine shaft passes through a central opening of the toothed wheel. In some embodiments, the rotational speed sensor of the aircraft engine sensor (in the sensor protection housing 501) is positioned adjacent to the toothed wheel, similar to those described above. Additionally, or alternatively, the aircraft engine may comprise an engine shaft and a driven gear secured to the engine shaft, where the engine shaft passes through a central opening of the driven gear. In some embodiments, the rotational speed sensor of the aircraft engine sensor (in the sensor protection housing 501) is positioned adjacent to the driven gear, similar to those described above.

In some embodiments, the plurality of connection wires 509 connects the aircraft engine sensor within the sensor protection housing 501 to a sensor connector 507. In some embodiments, the plurality of connection wires 509 comprise conductive material(s) and do not comprise any insulating materials, as the at least one ceramic insulator 511 insulates the plurality of connection wires 509, details of which are described herein.

In the example shown in FIG. 5, the plurality of connection wires 509 are positioned within a wire protection housing 503. In some embodiments, the sensor protection housing 501 is welded to the wire protection housing 503.

In some embodiments, the wire protection housing 503 is in a shape similar to a tube shape, defining an inner cavity that allows the plurality of connection wires 509 to pass through.

In some embodiments, the plurality of connection wires 509 and the wire protection housing 503 comprise metal material. For example, the plurality of connection wires 509 comprises materials such as, but not limited to, platinum, nickel, or copper, and the wire protection housing 503 comprises materials such as, but not limited to, stainless steel, nickel-based superalloys (such as, but not limited to, Inconel®), and/or the like.

As described above, the wire protection housing 503 and the plurality of connection wires 509 may be positioned in a high temperature environment, such as, but not limited to, a high temperature environment inside an aircraft engine. For example, at least a portion of the wire protection housing 503 (as well as the plurality of connection wires 509 that are within the wire protection housing 503) is positioned within the aircraft engine. It can be technically challenging to insulate the connection wires 509 in such an environment.

Various embodiments of the present disclosure overcome such technical challenges. For example, the aircraft engine sensing apparatus 500 comprises at least one ceramic insulator 511. In some embodiments, the at least one ceramic insulator 511 comprises electrically insulating material(s) such as, but not limited to, ceramic material. For example, the at least one ceramic insulator 511 comprises at least one of alumina ceramic material or glass-ceramic material, providing the technical benefits and advantages of electrical insulation.

While the description above provides examples of ceramic materials for the ceramic insulator, it is noted that the scope of the present disclosure is not limited to the description above. In some examples, an example ceramic insulator may comprise one or more additional and/or alternative non-metallic materials that have a high deltaic constant and can withstand a high temperature environment without breaking down or cracking.

In some embodiments, the at least one ceramic insulator 511 is positioned within the wire protection housing 503. For example, the at least one ceramic insulator 511 is positioned between the sensor protection housing 501 and the connector protection housing 505.

In some embodiments, the at least one ceramic insulator 511 defines a plurality of insulator openings (or insulator holes). In some embodiments, each of the plurality of connection wires 509 passes through one of the plurality of insulator openings of the at least one ceramic insulator 511.

Figure 7:
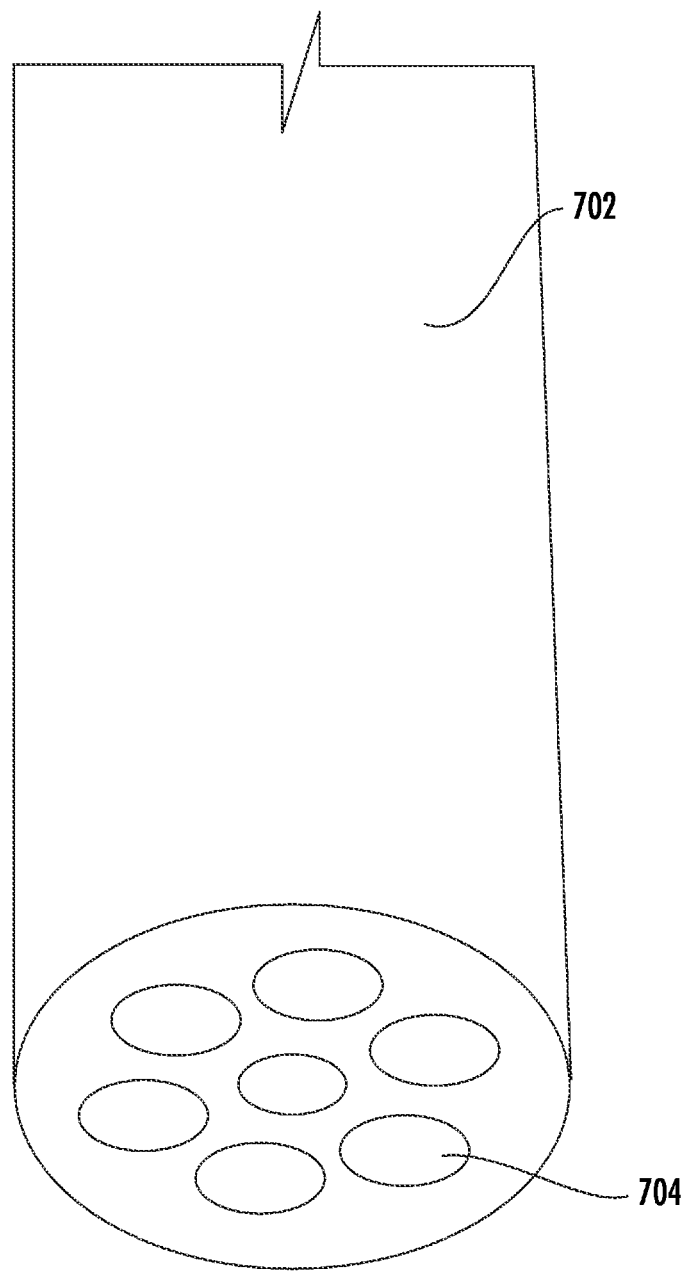
FIG. 7 illustrates an example ceramic insulator in accordance with some embodiments of the present disclosure.

For example, referring now to FIG. 7, an example ceramic insulator 702 in accordance with some embodiments of the present disclosure is illustrated.

In the example shown in FIG. 7, the example ceramic insulator 702 is in a shape similar to a tube shape. In some embodiments, the example ceramic insulator 702 comprises a plurality of insulator openings 704 that are distributed along a cross section of the example ceramic insulator 702 and extend through the length of the example ceramic insulator 702. In some embodiments, each of the plurality of connection wires passes through one of the plurality of insulator openings 704 of the ceramic insulator 702. In some embodiments, the plurality of insulator openings 704 are in parallel arrangements with one another and do not intersect, providing technical benefits and advantages of electrically insulating the connection wires.

Referring back to FIG. 5, in some embodiments, an outer, periphery surface of the at least one ceramic insulator 511 is in contact with an inner surface of the wire protection housing 503. As described above, each of the plurality of connection wires 509 passes through one of the insulator openings of the at least one ceramic insulator 511. As such, the at least one ceramic insulator 511 not only insulates the plurality of connection wires 509 from each other, but also insulates the plurality of connection wires 509 from the wire protection housing 503 (so that none of the plurality of connection wires 509 is in contact with the inner surface of the wire protection housing 503), providing technical benefits and advantages such as, but not limited to, enabling the aircraft engine sensing apparatus 500 to satisfy various operation safety requirements such as, but not limited to, the dielectric test requirements described above.

In some embodiments, the example aircraft engine sensing apparatus 500 comprises a plurality of glass insulators 519. In some embodiments, the plurality of glass insulators are disposed within the wire protection housing 503 and provide further insulation of the connection wires of the aircraft engine sensing apparatus 500.

In some embodiments, the plurality of glass insulators comprise glass materials. In some embodiments, the plurality of glass insulators may be in the form of small glass shards or spears. For example, glass materials may be grinded into smaller pieces (for example, to sizes similar to the sizes of shard and/or sand) to form the plurality of glass insulators. In some embodiments, the plurality of glass insulators can fill spaces and gaps between the wire protection housing 503 and the at least one ceramic insulator 511, and/or between the plurality of connection wires 509 and the at least one ceramic insulator 511, so as to provide further electrical insulation.

For example, at least some of the plurality of glass insulators may be positioned between the inner surface of the wire protection housing 503 and the outer surface of the at least one ceramic insulator 511. In such an example, the plurality of connection wires 509 are insulated from the wire protection housing 503 not only by the at least one ceramic insulator 511, but also by the plurality of glass insulators.

Additionally, or alternatively, at least some of the plurality of glass insulators may be positioned between the at least one ceramic insulator 511 and at least one of the plurality of connection wires 509. As described above, each of the at least one of the plurality of connection wires 509 passes through one of the plurality of insulator openings of the at least one ceramic insulator 511. In some embodiments, the plurality of glass insulators are positioned in the plurality of insulator openings and fill space and/or gaps between the plurality of connection wires 509 and the at least one ceramic insulator 511.

Additionally, or alternatively, at least some of the plurality of glass insulators may be positioned in the space at one or both ends of the wire protection housing 503 that are not insulated by the at least one ceramic insulator 511.

In the example shown in FIG. 5, the wire protection housing 503 comprises a first end 517 that is connected to the sensor protection housing 501, and at least a portion of the first end 517 is not insulated by the at least one ceramic insulator 511. In some embodiments, the plurality of glass insulators may be positioned within such portion of the first end 517 of the wire protection housing 503, and provide insulation of a portion of the plurality of connection wires 509 that are not insulated by the at least one ceramic insulator 511 at the first end 517.

Additionally, or alternatively, the wire protection housing 503 comprises a second end 515 that is connected to the connector protection housing 505, and at least a portion of the second end 515 is not insulated by the at least one ceramic insulator 511. In some embodiments, the plurality of glass insulators may be positioned within such portion of the second end 515 of the wire protection housing 503, and provide insulation of portions of the plurality of connection wires 509 that are not insulated by the at least one ceramic insulator 511 at the second end 515.

In some embodiments, the sensor connector 507 is positioned within a connector protection housing 505. In some embodiments, the connector protection housing 505 is welded to the wire protection housing 503. In some embodiments, the connector protection housing 505 is positioned on an engine casing of an aircraft engine, similar to those described above in connection with at least FIG. 2 to FIG. 4B.

In some embodiments, the sensor connector 507 comprises a plurality of sensor output pins 513. In some embodiments, each of the plurality of connection wires 509 is connected to one of the plurality of sensor output pins 513.

As such, the example aircraft engine sensing apparatus 500 described above in connection with FIG. 5 illustrates an example of insulating the plurality of connection wires 509 that connects the aircraft engine sensor within the sensor protection housing 501 to the plurality of sensor output pins 513 of the sensor connector 507 in the connector protection housing 505. In some embodiments, the plurality of connection wires 509 extends through the sensor protection housing 501, the plurality of insulator openings of the at least one ceramic insulator 511, and the connector protection housing 505. In some embodiments, the at least one ceramic insulator 511 provides insulation of the plurality of connection wires 509 and overcome various technical challenges and difficulties described above.

Figure 6:
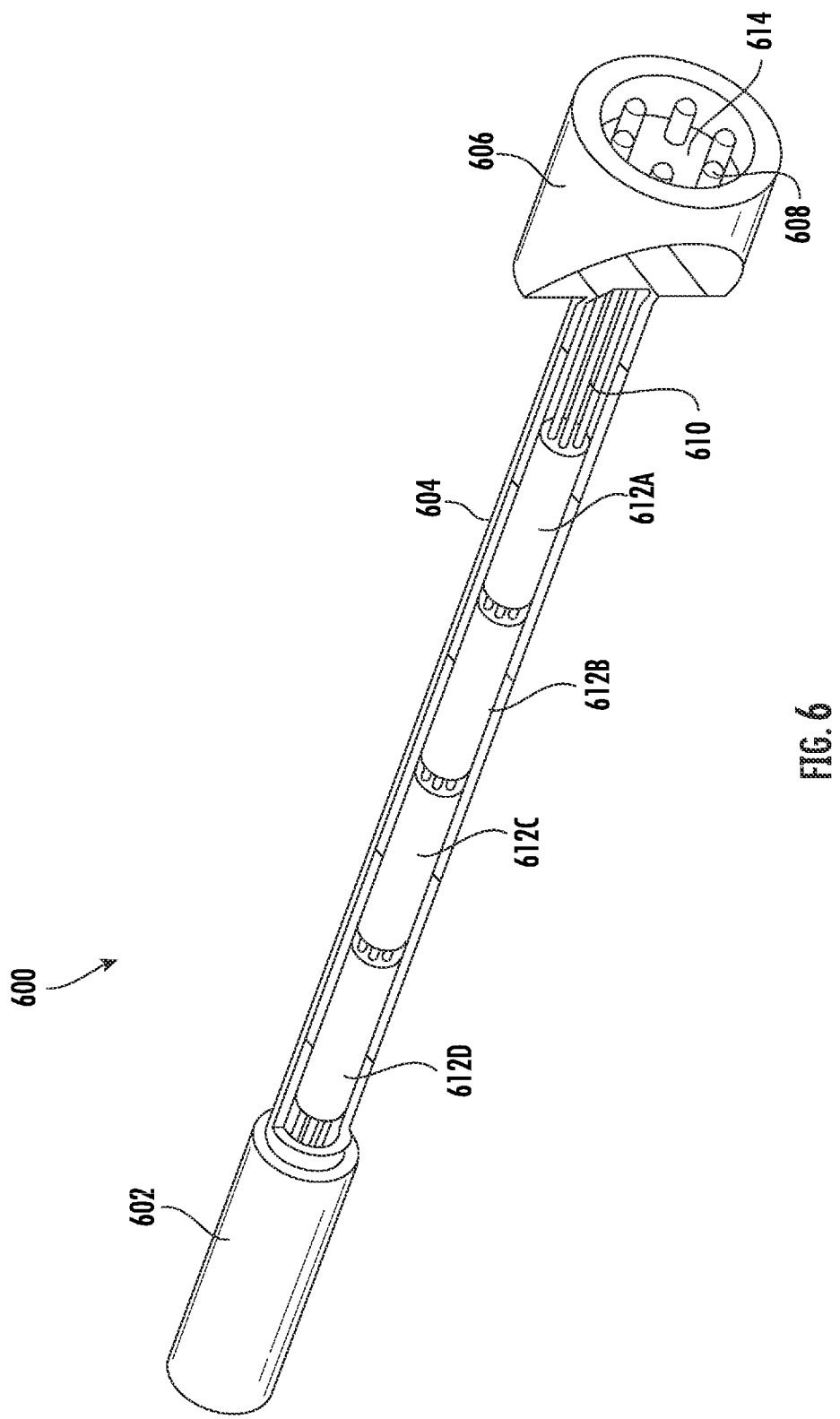
FIG. 6 illustrates an example cutaway view of an example aircraft engine sensing apparatus in accordance with some embodiments of the present disclosure.

Referring now to FIG. 6, an example cutaway view of an example aircraft engine sensing apparatus 600 in accordance with some embodiments of the present disclosure is illustrated.

In some embodiments, the aircraft engine sensing apparatus 600 comprises an aircraft engine sensor, a plurality of connection wires 610, and a plurality of ceramic insulators (such as, but not limited to, the ceramic insulator 612A, the ceramic insulator 612B, the ceramic insulator 612C, and the ceramic insulator 612D).

Similar to those described above in connection with at least FIG. 2 to FIG. 4B, the aircraft engine sensor is positioned within a sensor protection housing 602, and the aircraft engine sensor comprises a rotational speed sensor. In some embodiments, the sensor protection housing 602 is secured to an inner engine casing of the aircraft engine and positioned within the aircraft engine.

In some embodiments, the aircraft engine may comprise an engine shaft and a toothed wheel secured to the engine shaft, where the engine shaft passes through a central opening of the toothed wheel. In some embodiments, the rotational speed sensor of the aircraft engine sensor (in the sensor protection housing 602) is positioned adjacent to the toothed wheel, similar to those described above. Additionally, or alternatively, the aircraft engine may comprise an engine shaft and a driven gear secured to the engine shaft, where the engine shaft passes through a central opening of the driven gear. In some embodiments, the rotational speed sensor of the aircraft engine sensor (in the sensor protection housing 602) is positioned adjacent to the driven gear, similar to those described above.

In some embodiments, the plurality of connection wires 610 connect the aircraft engine sensor within the sensor protection housing 602 to a sensor connector 614. In some embodiments, the plurality of connection wires 610 comprise conductive material(s) and do not comprise any insulating materials, as the plurality of ceramic insulators (such as, but not limited to, the ceramic insulator 612A, the ceramic insulator 612B, the ceramic insulator 612C, and the ceramic insulator 612D) insulates the plurality of connection wires 610.

In the example shown in FIG. 6, the plurality of connection wires 610 are positioned within a wire protection housing 604. In some embodiments, the sensor protection housing 602 is welded to the wire protection housing 604.

Similar to the examples described above in connection with FIG. 2 to FIG. 5, the wire protection housing 604 is in a shape similar to a tube shape, defining an inner cavity that allows the plurality of connection wires 610 to pass through. In some embodiments, the plurality of connection wires 610 and the wire protection housing 604 comprise metal material, similar to those described above.

As described above, the wire protection housing 604 and the plurality of connection wires 610 may be positioned in a high temperature environment, such as, but not limited to, a high temperature environment inside an aircraft engine. For example, at least a portion of the wire protection housing 604 (as well as the plurality of connection wires 610 that are within the wire protection housing 604) is positioned within the aircraft engine. It can be technically challenging to insulate the connection wires 610 in such an environment.

Various embodiments of the present disclosure overcome such technical challenges. For example, the aircraft engine sensing apparatus 600 comprises a plurality of ceramic insulators (such as, but not limited to, the ceramic insulator 612A, the ceramic insulator 612B, the ceramic insulator 612C, and the ceramic insulator 612D).

Similar to the at least one ceramic insulator 511 described in connection with FIG. 5 and the ceramic insulator 702 described in connection with FIG. 7, each of the plurality of ceramic insulators (such as, but not limited to, the ceramic insulator 612A, the ceramic insulator 612B, the ceramic insulator 612C, and the ceramic insulator 612D) comprises electrically insulating material(s) such as, but not limited to, ceramic material (for example, at least one of alumina ceramic material or glass-ceramic material).

While the description above provides examples of ceramic materials for the ceramic insulator, it is noted that the scope of the present disclosure is not limited to the description above. In some examples, an example ceramic insulator may comprise one or more additional and/or alternative materials that have a high deltaic constant and can withstand a high temperature environment without breaking down or cracking.

In some embodiments, the plurality of ceramic insulators (such as, but not limited to, the ceramic insulator 612A, the ceramic insulator 612B, the ceramic insulator 612C, and the ceramic insulator 612D) are positioned within the wire protection housing 604. For example, the plurality of ceramic insulators (such as, but not limited to, the ceramic insulator 612A, the ceramic insulator 612B, the ceramic insulator 612C, and the ceramic insulator 612D) are positioned between the sensor protection housing 602 and the connector protection housing 606.

In some embodiments, each of the plurality of ceramic insulators (such as, but not limited to, the ceramic insulator 612A, the ceramic insulator 612B, the ceramic insulator 612C, and the ceramic insulator 612D) defines a plurality of insulator openings (or insulator holes). In some embodiments, each of the plurality of connection wires 610 passes through one of the plurality of insulator openings in each of the plurality of ceramic insulators (such as, but not limited to, the ceramic insulator 612A, the ceramic insulator 612B, the ceramic insulator 612C, and the ceramic insulator 612D).

In some embodiments, each of the plurality of ceramic insulators (such as, but not limited to, the ceramic insulator 612A, the ceramic insulator 612B, the ceramic insulator 612C, and the ceramic insulator 612D) has the same size as another one of ceramic insulators. In some embodiments, the number of ceramic insulators in the aircraft engine sensing apparatus 600 can be determined based on the length of the ceramic insulator and the length of the plurality of connection wires 610. For example, the plurality of ceramic insulators may be spaced apart from one another so that the plurality of ceramic insulators (such as, but not limited to, the ceramic insulator 612A, the ceramic insulator 612B, the ceramic insulator 612C, and the ceramic insulator 612D) cover the entire length or most of the length of the plurality of connection wires 610.

In some embodiments, each outer surface of the plurality of ceramic insulators (such as, but not limited to, the ceramic insulator 612A, the ceramic insulator 612B, the ceramic insulator 612C, and the ceramic insulator 612D) is in contact with an inner surface of the wire protection housing 604. As described above, each of the plurality of connection wires 610 passes through one of the insulator openings of the plurality of ceramic insulators (such as, but not limited to, the ceramic insulator 612A, the ceramic insulator 612B, the ceramic insulator 612C, and the ceramic insulator 612D). As such, the plurality of ceramic insulators (such as, but not limited to, the ceramic insulator 612A, the ceramic insulator 612B, the ceramic insulator 612C, and the ceramic insulator 612D) not only insulate the plurality of connection wires 610 from each other, but also insulate the plurality of connection wires 610 from the wire protection housing 604 (so that none of the plurality of connection wires 610 is in contact with an inner surface of the wire protection housing 604), providing technical benefits and advantages such as, but not limited to, enabling the aircraft engine sensing apparatus 600 to satisfy various operation safety requirements such as, but not limited to, the dielectric test requirements described above.

In some embodiments, the example aircraft engine sensing apparatus 600 comprises a plurality of glass insulators, similar to the plurality of glass insulators 519 described above in connection with FIG. 5. In some embodiments, the plurality of glass insulators are disposed within the wire protection housing 604 and provide further insulation of the connection wires of the aircraft engine sensing apparatus 600.

For example, at least some of the plurality of glass insulators may be positioned between the inner surface of the wire protection housing 604 and the outer surface of the plurality of ceramic insulators (such as, but not limited to, the ceramic insulator 612A, the ceramic insulator 612B, the ceramic insulator 612C, and the ceramic insulator 612D), similar to those described above.

Additionally, or alternatively, at least some of the plurality of glass insulators may be positioned between the plurality of ceramic insulators (such as, but not limited to, the ceramic insulator 612A, the ceramic insulator 612B, the ceramic insulator 612C, and the ceramic insulator 612D) and at least one of the plurality of connection wires 610, similar to those described above.

Additionally, or alternatively, at least some of the plurality of glass insulators may be positioned at one or both ends of the wire protection housing 604 that are not insulated by the plurality of ceramic insulators, similar to those described above.

Additionally, or alternatively, at least some of the plurality of glass insulators are positioned between the plurality of ceramic insulators (such as, but not limited to, between the ceramic insulator 612A and the ceramic insulator 612B, between the ceramic insulator 612B and the ceramic insulator 612C, and/or between the ceramic insulator 612C and the ceramic insulator 612D).

In some embodiments, the sensor connector 614 is positioned within a connector protection housing 606. In some embodiments, the connector protection housing 606 is welded to the wire protection housing 604. In some embodiments, the connector protection housing 606 is positioned on an engine casing of an aircraft engine, similar to those described above in connection with at least FIG. 2 to FIG. 5.

In some embodiments, the sensor connector 614 comprises a plurality of sensor output pins 608. In some embodiments, each of the plurality of connection wires 610 is connected to one of the plurality of sensor output pins 608.

As such, the example aircraft engine sensing apparatus 600 described above in connection with FIG. 6 illustrates an example of insulating the plurality of connection wires 610 that connect the aircraft engine sensor within the sensor protection housing 602 to the plurality of sensor output pins 608 of the sensor connector 614 in the connector protection housing 606. In some embodiments, the plurality of connection wires 610 extends through the sensor protection housing 602, the plurality of insulator openings of the plurality of ceramic insulators (such as, but not limited to, the ceramic insulator 612A, the ceramic insulator 612B, the ceramic insulator 612C, and the ceramic insulator 612D), and the connector protection housing 606. In some embodiments, the plurality of ceramic insulators (such as, but not limited to, the ceramic insulator 612A, the ceramic insulator 612B, the ceramic insulator 612C, and the ceramic insulator 612D) provide insulation of the plurality of connection wires 610 and overcome various technical challenges and difficulties described above.

Figure 8:
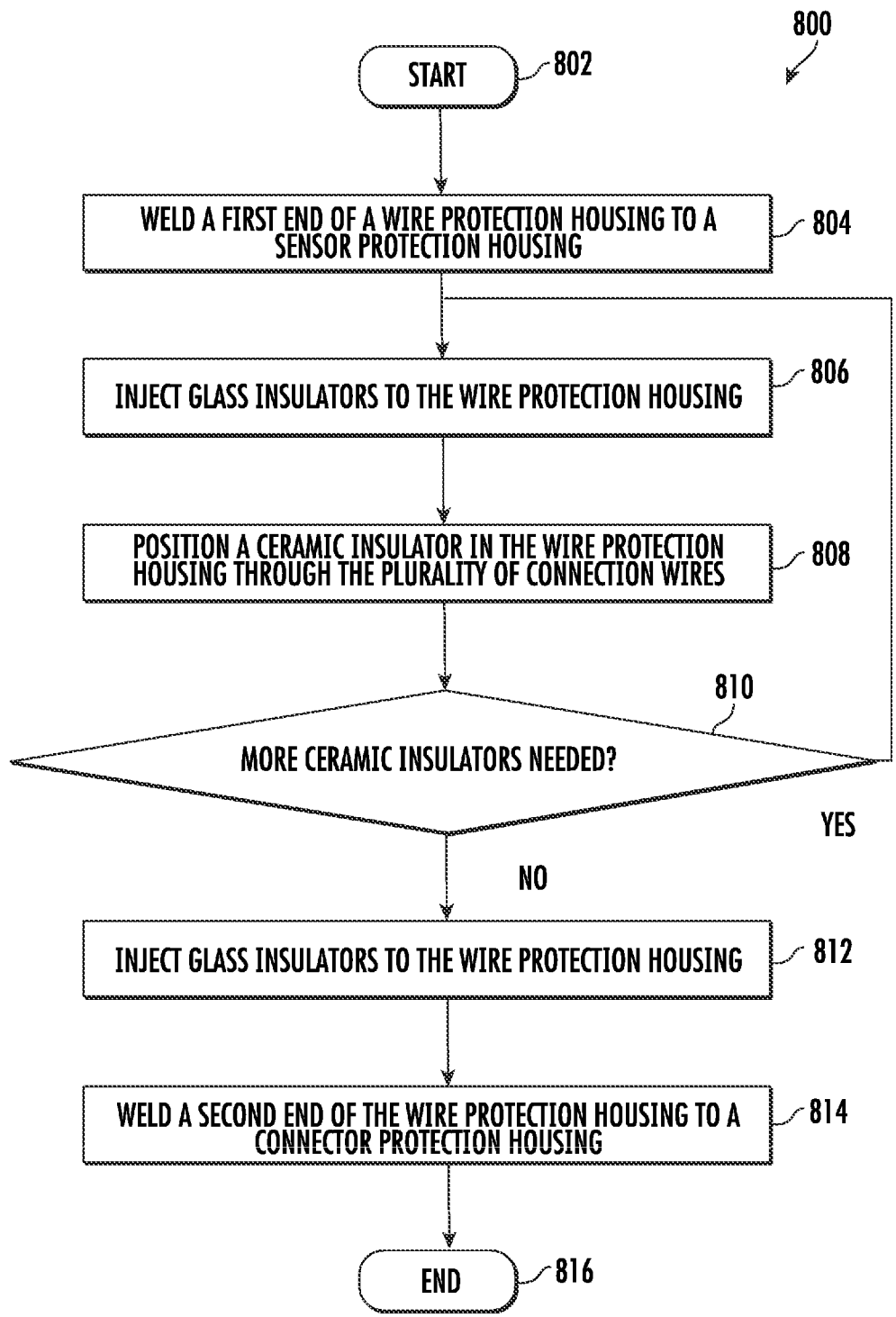
FIG. 8 illustrates an example method of manufacturing an example aircraft engine sensing apparatus with insulated connection wires in accordance with some embodiments of the present disclosure.

Referring now to FIG. 8, an example method 800 of manufacturing an example aircraft engine sensing apparatus with insulated connection wires in accordance with some embodiments of the present disclosure is illustrated.

In the example shown in FIG. 8, the example method 800 starts at step/operation 802.

In some embodiments, subsequent to step/operation 802, the example method 800 proceeds to step/operation 804. As step/operation 804, the example method 800 includes welding a first end of a wire protection housing to a sensor protection housing.

In some embodiments, the sensor protection housing is similar to various example sensor protection housings described herein. For example, an aircraft engine sensor (such as, but not limited to, a rotational speed sensor) is positioned within the sensor protection housing.

In some embodiments, the wire protection housing is similar to various wire protection housings described herein. For example, a plurality of connections wires (that are connected to the aircraft engine sensor in the sensor protection housing) are positioned in the wire protection housing.

In some embodiments, the wire protection housing comprises a first end and a second end that is opposite to the first end. In some embodiments, welding the first end of the wire protection housing to the sensor protection housing hermetically seals the sensor protection housing.

Referring back to FIG. 8, subsequent to step/operation 804, the example method 800 proceeds to step/operation 806. As step/operation 806, the example method 800 includes injecting glass insulators to the wire protection housing.

In some embodiments, the glass insulators are similar to various glass insulators described herein. For example, the glass insulators may be in the form of small glass shards or spears. For example, glass materials may be grinded into smaller pieces (for example, to the sizes similar to sizes of shard and/or sand) to form the glass insulators.

In some embodiments, the glass insulators are injected and/or poured towards the first end of the sensor protection housing through the second end of the wire protection housing. As described above in connection with step/operation 804, the first end of the wire protection housing is welded to the sensor protection housing. As such, the glass insulators provide an insulation layer within the wire protection housing and on top of the sensor protection housing.

In some embodiments, a vibration table is utilized to settle and/or condense the glass insulators in the insulation layer. As described above in connection with step/operation 804, the first end of the wire protection housing is welded to the sensor protection housing. In some embodiments, the sensor protection housing is positioned on the vibration table so that the second end of the wire protection housing faces upwards. As the vibration table vibrates, the glass insulators in the insulation layer become settled and condensed, therefore providing a compact layer of insulation.

Referring back to FIG. 8, subsequent to step/operation 806, the example method 800 proceeds to step/operation 808. As step/operation 808, the example method 800 includes positioning a ceramic insulator in the wire protection housing through the plurality of connection wires.

In some embodiments, the ceramic insulator is similar to various example ceramic insulators described herein. For example, the ceramic insulator comprises ceramic materials (for example, alumina ceramic material and/or glass-ceramic material), and/or non-metallic materials that have a high deltaic constant and can withstand a high temperature environment without breaking down or cracking.

In some embodiments, the ceramic insulator is in a shape similar to a tube shape. In some embodiments, the ceramic insulator is pre-made. For example, the ceramic insulator is manufactured according to a standard length and/or size. In some embodiments, the outer diameter of the ceramic insulator matches or is smaller than the inner diameter of the wire protection housing so as to allow the ceramic insulator to be positioned within the wire protection housing.

Similar to various examples described above, the ceramic insulator comprises a plurality of insulator openings across a cross section of the ceramic insulator. In some embodiments, the locations of the insulator openings are determined based on the relative positions of the connection wires. In some embodiments, to position the ceramic insulator into the wire protection housing, the example method 800 includes positioning each of the connection wires through one of the plurality of insulator openings of the ceramic insulator.

Referring back to FIG. 8, subsequent to step/operation 808, the example method 800 proceeds to step/operation 810. As step/operation 810, the example method 800 includes determining whether more ceramic insulators are needed.

In some embodiments, the determination of whether more ceramic insulators are needed is based on the length of the ceramic insulator and the length of the connection wire in the wire protection housing.

For example, if the total length of the ceramic insulator(s) that have been positioned in the wire protection housing equals or approximates the length of the connection wires, the example method 800 determines that no more ceramic insulator is needed at step/operation 810. In other words, the example method 800 determines that the ceramic insulator (s) can insulate most or all of the connection wires, similar to those described and illustrated in connection with FIG. 5.

As another example, if the total length of the ceramic insulator(s) that have been positioned in the wire protection housing is less than or does not approximate the length of the connection wires, the example method 800 determines that more ceramic insulators are needed at step/operation 810. In other words, the example method 800 determines that more than one ceramic insulator is needed to insulate the connection wires, similar to those described and illustrated in connection with FIG. 6.

Referring back to FIG. 8, if, at step/operation 810, the example method 800 determines that more ceramic insulators are needed, the example method 800 returns to step/operation 806. At step/operation 806, the example method 800 injects glass insulators into the wire protection housing through the second end of the wire protection housing.

Similar to those described above, a vibration table can be utilized to condense the glass insulators. For example, the sensor protection housing is positioned on the vibration table so that the second end of the wire protection housing faces upwards. As the vibration table vibrates, the glass insulators in the insulation layer become settled and condensed, and may fill the gaps between an inner surface of the wire protection housing and an outer surface of the at least one ceramic insulator, between the at least one ceramic insulator and at least one of the plurality of connection wires, and between the plurality of ceramic insulators. As such, the glass insulators can provide additional insulation protection. Subsequently, the example method 800 continues to step/operation 808 and step/operation 810 as described above.

Referring back to FIG. 8, if, at step/operation 810, the example method 800 determines that no more ceramic insulators are needed, the example method 800 proceeds to step/operation 812. At step/operation 812, the example method 800 includes injecting glass insulators to the wire protection housing.

Similar to those described above, a vibration table can be utilized to settle and/or condense the glass insulators. For example, the sensor protection housing is positioned on the vibration table so that the second end of the wire protection housing faces upwards. As the vibration table vibrates, the glass insulators in the insulation layer become settled and condensed, and may fill the gaps between an inner surface of the wire protection housing and an outer surface of the at least one ceramic insulator, between the at least one ceramic insulator and at least one of the plurality of connection wires, and between the plurality of ceramic insulators. Additionally, the glass insulators can form an insulation layer on top of the ceramic insulator (for example, near the second end of the wire protection housing). As such, the glass insulators can provide additional insulation protection.

Referring back to FIG. 8, subsequent to step/operation 812, the example method 800 proceeds to step/operation 814. As step/operation 814, the example method 800 includes welding the second end of the wire protection housing to the connector protection housing.

In some embodiments, the connector protection housing is similar to various connector protection housings described above. For example, a sensor connector is positioned within the connector protection housing and comprises a plurality of sensor output pins.

In some embodiments, prior to welding the second end of the wire protection housing to the connector protection housing, the example method 800 comprises connecting the connection wires in the wire protection housing to the sensor output pins. As such, the connection wires connect the aircraft engine sensor to the sensor connector, therefore conveying detection signals from the aircraft engine sensor to outside the aircraft engine (for example, to a controller of the aircraft).

In some embodiments, welding the second end of the wire protection housing to the connector protection housing hermetically seals the wire protection housing.

Referring back to FIG. 8, subsequent to step/operation 814, the example method 800 proceeds to step/operation 816 and ends.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:
1. An aircraft engine sensing apparatus comprising:
    an aircraft engine sensor positioned within an aircraft engine;
    a plurality of connection wires connecting the aircraft engine sensor to a sensor connector, wherein the plurality of connection wires are positioned within a wire protection housing;
    at least one ceramic insulator positioned within the wire protection housing and defining a plurality of insulator openings, wherein each of the plurality of connection wires passes through one of the plurality of insulator openings, wherein the at least one ceramic insulator is positioned between the aircraft engine sensor and the sensor connector; and
    a plurality of glass insulators, wherein at least some of the plurality of glass insulators are positioned between an inner surface of the wire protection housing and an outer surface of the at least one ceramic insulator.
2. The aircraft engine sensing apparatus of claim 1, wherein the aircraft engine sensor comprises a rotational speed sensor.

3. The aircraft engine sensing apparatus of claim 2, wherein the aircraft engine comprises an engine shaft and a toothed wheel secured to the engine shaft, wherein the engine shaft passes through a central opening of the toothed wheel, wherein the rotational speed sensor is positioned adjacent to the toothed wheel.

4. The aircraft engine sensing apparatus of claim 2, wherein the aircraft engine comprises an engine shaft and a driven gear secured to the engine shaft, wherein the engine shaft passes through a central opening of the driven gear, wherein the rotational speed sensor is positioned adjacent to the driven gear.

5. The aircraft engine sensing apparatus of claim 1, wherein the aircraft engine sensor is positioned within a sensor protection housing.

6. The aircraft engine sensing apparatus of claim 5, wherein the sensor protection housing is secured to an inner engine casing of the aircraft engine.

7. The aircraft engine sensing apparatus of claim 5, wherein the sensor protection housing is welded to the wire protection housing.

8. The aircraft engine sensing apparatus of claim 1, wherein at least a portion of the wire protection housing is positioned within the aircraft engine.

9. The aircraft engine sensing apparatus of claim 1, wherein the plurality of connection wires and the wire protection housing comprise metal material.

10. The aircraft engine sensing apparatus of claim 1, wherein the sensor connector is positioned within a connector protection housing.

11. The aircraft engine sensing apparatus of claim 10, wherein the connector protection housing is positioned on an engine casing of the aircraft engine.

12. The aircraft engine sensing apparatus of claim 10, wherein the connector protection housing is welded to the wire protection housing.

13. The aircraft engine sensing apparatus of claim 10, wherein the sensor connector comprises a plurality of sensor output pins, wherein each of the plurality of connection wires is connected to one of the plurality of sensor output pins.

14. The aircraft engine sensing apparatus of claim 1, wherein the at least one ceramic insulator comprises at least one of alumina ceramic material or glass-ceramic material.

15. The aircraft engine sensing apparatus of claim 1, wherein the outer surface of the at least one ceramic insulator is in contact with the inner surface of the wire protection housing.

16. The aircraft engine sensing apparatus of claim 1, wherein at least some of the plurality of glass insulators are positioned between the at least one ceramic insulator and at least one of the plurality of connection wires.

* * * * *